F. H. LAWTON.
SHOCK ABSORBING AND SPRING APPLIANCE.
APPLICATION FILED JAN. 9, 1918.

1,320,157. Patented Oct. 28, 1919.

Inventor
Frederick H. Lawton
By Moulton & Lurance
Attorneys.

UNITED STATES PATENT OFFICE.

FREDERICK H. LAWTON, OF GRAND RAPIDS, MICHIGAN, ASSIGNOR OF ONE-HALF TO ARTHUR A. LAWTON, OF GRAND RAPIDS, MICHIGAN.

SHOCK-ABSORBING AND SPRING APPLIANCE.

1,320,157.  Specification of Letters Patent.  Patented Oct. 28, 1919.

Application filed January 9, 1918. Serial No. 210,970.

*To all whom it may concern:*

Be it known that I, FREDERICK H. LAWTON, a citizen of the United States of America, residing at Grand Rapids, in the county of Kent and State of Michigan, have invented certain new and useful Improvements in Shock-Absorbing and Spring Appliances; and I do hereby declare the following to be a full, clear, and exact description of the invention, such as will enable others skilled in the art to which it appertains to make and use the same.

The present invention relates to a shock absorbing appliance which may be applied in a number of places to receive and take care of shocks and strains to which various parts of vehicles may be subjected, though it is to be understood that the invention may be applied generally at the meeting ends of any two parts of a member to connect the same together and take the strains to which said member may be subjected, the same being of a character which normally would cause the member to bend at a point between its ends. One particular place at which the invention may be applied is at the springs of vehicles, and it is one of the primary objects and purposes of the invention to apply a shock absorbing appliance at various points in the length of said spring whereby the body carried by the spring is permitted to ride in an easy manner, this appliance being adapted in effect to take the place of and be substituted for the spring elements of the vehicle spring in such cases, it being possible to substitute for the spring a plurality of rigid elements located in alinement and connected at their adjacent ends by the device of my invention.

For an understanding of the invention and the ways that it may be constructed and used, reference may be had to the accompanying drawing, in which—

Like reference characters relate to like parts in the different views of the drawing.

Figure 1:
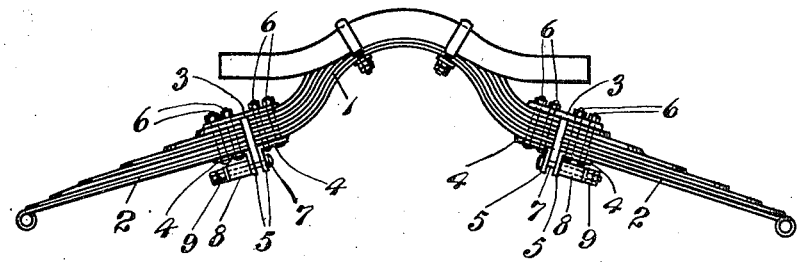
Figure 1 is an elevation of a motor vehicle spring equipped with my invention.

As shown in Fig. 1 a motor vehicle spring is divided into three parts including a central section 1, to which the body of the vehicle is secured, in alinement with which are two end sections 2, which at their outer ends are attached to a stationary part of the running gear of the vehicle. The adjacent ends of sections 1 and 2 are spaced a short distance apart though this is not a necessary or essential feature of the invention. A metal plate 3 of readily bendable nature is located above the sections 1 and 2 and bridges the space between them, and on the under side of each section there is placed an angle iron having a substantially horizontal leg 4 lying against the under side of the spring, and the outwardly extending legs 5 of the two angle irons parallel each other in close proximity. Suitably secured members such as bolts 6 may pass through the plate and horizontal legs 4 of the angle irons and secure the same to the sections of the spring. A bolt 7 passes through both legs 5, and the head of said bolt bears against one of the legs, while its shank extends a considerable distance through the other leg so that it may receive a sleeve 8 of rubber which is held in place by suitable nuts and washer 9 at the end of the bolt as shown.

With this construction, the weight of the body and of anything carried thereby, transmitted to the spring, is in turn transmitted to the sleeve 8, which under the various shocks and strains imparted by the weight of the body may compress and expand to take care of the same. The sections 1 and 2 may be of the leaf spring type shown in Fig. 1, or each may be of a solid metal construction, the entire spring however in such case being furnished by the rubber sleeves 8.

Figure 2:
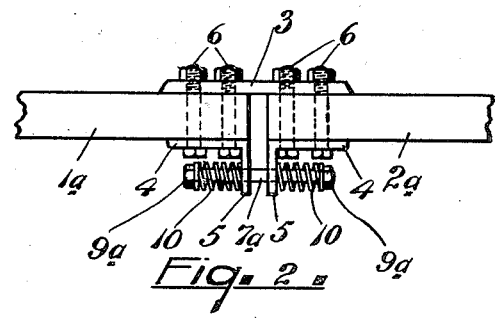
Figs. 2 and 3 are fragmentary side elevations illustrating two different modifications in the construction of the invention.

In Fig. 2 a modification is shown, the two sections 1ª and 2ª being of solid form and connected by the plate 3, bolts 6, and angle irons underneath the sections, as previously described. The bolt 7ª, however, extends a distance through both of the depending legs of the angle irons and carries a coil spring 10 at each end between said legs and the nuts 9ª at the ends of the bolt, these springs being equivalent in action to the sleeve 8. It is to be understood that either one or two springs may be used, if desired.

Figure 3:
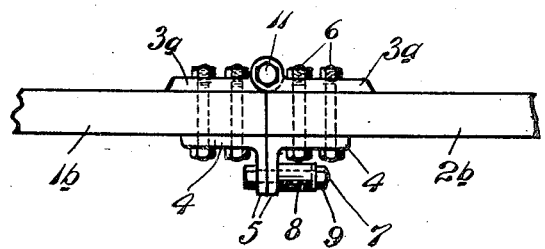
Figure 4:
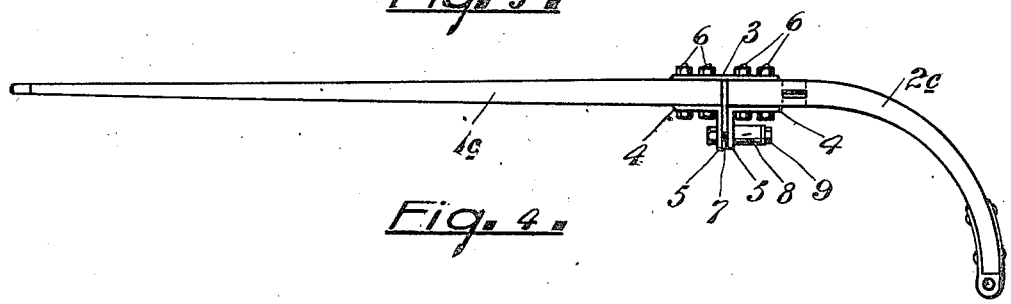
Fig. 4 is a side elevation showing my invention applied in another relation, that is, to the thills of a vehicle.

In Fig. 3 the structure is substantially identical with that shown in Fig. 1 except that the sections 1ᵇ and 2ᵇ are solid, have no space between the ends thereof, and that the plate 3 is divided into two parts 3ᵃ pivotally connected together at their meeting ends, as indicated at 11, being equivalent to the bendable plate 3 described. In Fig. 4 my invention is shown applied to a thill, the same being divided into two sections 1ᶜ and 2ᶜ and the shock absorbing appliance located at the meeting ends of said sections, this being of particular value in sulkies and similar two wheeled carts where considerable strains are taken by the thills.

I have shown several modifications and different applications of the invention, the same being of utility to absorb shocks as will be evident. In all of the constructions shown the plate 3 is located above and the angle irons below the member to which the appliance is attached. This is because, in the illustrations shown, the tendency of the members is to bend in a downward direction under the application of the various forces to which they are subjected. If, however, the tendency of the member was to bend in the other direction, the same appliance may be used, being merely reversed in position, this being the case with many springs in vehicles, especially the front springs of motor trucks. Various other slight modifications in constructive detail may be resorted to by others skilled in the art and I, accordingly, do not wish to be limited to the exact structures shown, or the two methods of application shown, but consider myself entitled to all modifications of structure and uses thereof within the scope of the appended claims which define the invention.

I claim:

1. In vehicle spring construction, a central section adapted to be secured directly to the under side of a vehicle body, two end sections normally in alinement with the central section, means connecting each of the end sections to the central section at their adjacent ends and at one side thereof and permitting movements of the end sections with respect to the central section so that different angular positions may be taken by said end sections, and yielding means disposed at the opposite side of and at the adjacent ends of said central and end sections tending to hold the central and end sections in alinement, substantially as described.

2. In a vehicle spring comprising a central section adapted to be secured to a vehicle body, two end sections normally in alinement with the central section, means hingedly connecting each of the end sections to the central section at their adjacent ends so that different angular positions may be taken by said end sections with respect to the central section, and yielding means associated with the central and each end sections normally holding the sections in alinement, but yielding under application of force so that the end sections may take said different angular positions, substantially as described.

3. In combination, a vehicle spring comprising a section adapted to be secured to the under side of a vehicle body, an end section normally in alinement therewith and having hinged connection thereto, and yielding means associated with said sections at their adjacent ends for normally holding the sections in alinement, but yielding under application of force to permit said sections to take said different angular positions with respect to each other, substantially as described.

In testimony whereof I affix my signature.

FREDERICK H. LAWTON.